United States Patent
Barbera et al.

(12) 
(10) Patent No.: US 11,473,627 B2
(45) Date of Patent: Oct. 18, 2022

(54) SEALING DEVICE WITH DYNAMIC ACTION, PARTICULARLY FOR ROLLING BEARINGS

(71) Applicant: Aktiebolaget SKF, Gothenburg (SE)

(72) Inventors: Stellario Barbera, Turin (IT); Claudio Foti, Villanova d'asti (IT); Andrea Serafini, Pinerolo (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/032,878

(22) Filed: Sep. 25, 2020

(65) Prior Publication Data

US 2021/0102579 A1 Apr. 8, 2021

(30) Foreign Application Priority Data

Oct. 4, 2019 (IT) .......................... 102019000017879

(51) Int. Cl.
*F16C 33/78* (2006.01)
*F16C 41/00* (2006.01)

(52) U.S. Cl.
CPC ........ *F16C 33/7883* (2013.01); *F16C 41/007* (2013.01)

(58) Field of Classification Search
CPC .............. F16C 33/7816; F16C 33/7869; F16C 33/7873; F16C 33/7876; F16C 33/7879; F16C 33/7883; F16C 33/805; F16J 15/3256; F16J 15/326; F16J 15/3264
See application file for complete search history.

(56) References Cited

U.S. PATENT DOCUMENTS 5,947,611 A 9/1999 Nagase
10,907,688 B2 * 2/2021 Kamiji .................... F16C 33/80

FOREIGN PATENT DOCUMENTS

| JP | 2005098417 | 4/2005 |
| JP | 2005240894 | 9/2005 |
| JP | 2013044420 | * 3/2013 |
| WO | 2008018765 | 2/2008 |
| WO | 2015064400 | 5/2015 |

OTHER PUBLICATIONS

Search Report for corresponding Italy application No. 102019000017879 dated Jun. 25, 2020.

* cited by examiner

*Primary Examiner* — James Pilkington
(74) *Attorney, Agent, or Firm* — Reed Smith LLP

(57) ABSTRACT

Sealing device including a first annular element coupled to a first fixed mechanical member, and a second annular element coupled to a second rotating mechanical member, for protecting an annular compartment delimited between the members; the first element being provided with at least one annular sealing lip configured to interact with the second element, which has a radial edge of a flange portion arranged at an edge of a sleeve portion of the first element, thus forming with the latter a radial gap configured as a labyrinth seal; wherein the radial gap of the flange portion of the second annular element carries a plurality of depressions arranged in a crown, spaced adjacently to one another at the radial gap and configured to generate, as a result of the rotation of the second element, a dynamic effect (F) for the purpose of repelling any contaminants impelled towards the radial gap.

15 Claims, 4 Drawing Sheets

SEALING DEVICE WITH DYNAMIC ACTION, PARTICULARLY FOR ROLLING BEARINGS

CROSS REFERENCE RELATED APPLICATION

This application is based on and claims priority to Italian Application No. 102019000017879, filed Oct. 4, 2019, under 35 U.S.C. § 119 the entire contents of which are incorporated herein by reference.

FIELD

The present invention relates to a sealing device with dynamic action, particularly applicable to, or in the presence of, a rolling bearing inserted between a first and a second mechanical member rotating relatively to one another, for example including the inner ring and the outer ring of the rolling bearing, for the purpose of protecting the bearing and/or the rolling bodies of the bearing from external contaminants, while simultaneously retaining any lubricating grease inside.

BACKGROUND

As is known, it is currently a requirement in industry that a sealing device, of what is known as the "pack seal" type for example, for insertion between two members in relative rotation, should have a greater sealing capacity combined with a lower friction torque than in the past. There is also an increasing demand for seals that have low friction without any reduction in their fluid-tightness.

BRIEF DESCRIPTION OF THE DRAWINGS

Embodiments of the invention will now be described with reference to the appended drawings, which show some non-limiting examples of embodiments of the invention, in which.

DETAILED DESCRIPTION

One way to reduce friction in a sealing device is to reduce the number of sealing lips in sliding contact with one of the two members in relative rotation, or to form one or more lips configured to provide non-sliding labyrinth-type seals, but this usually entails a reduction in the sealing capacity of the sealing device.

Figure 1:
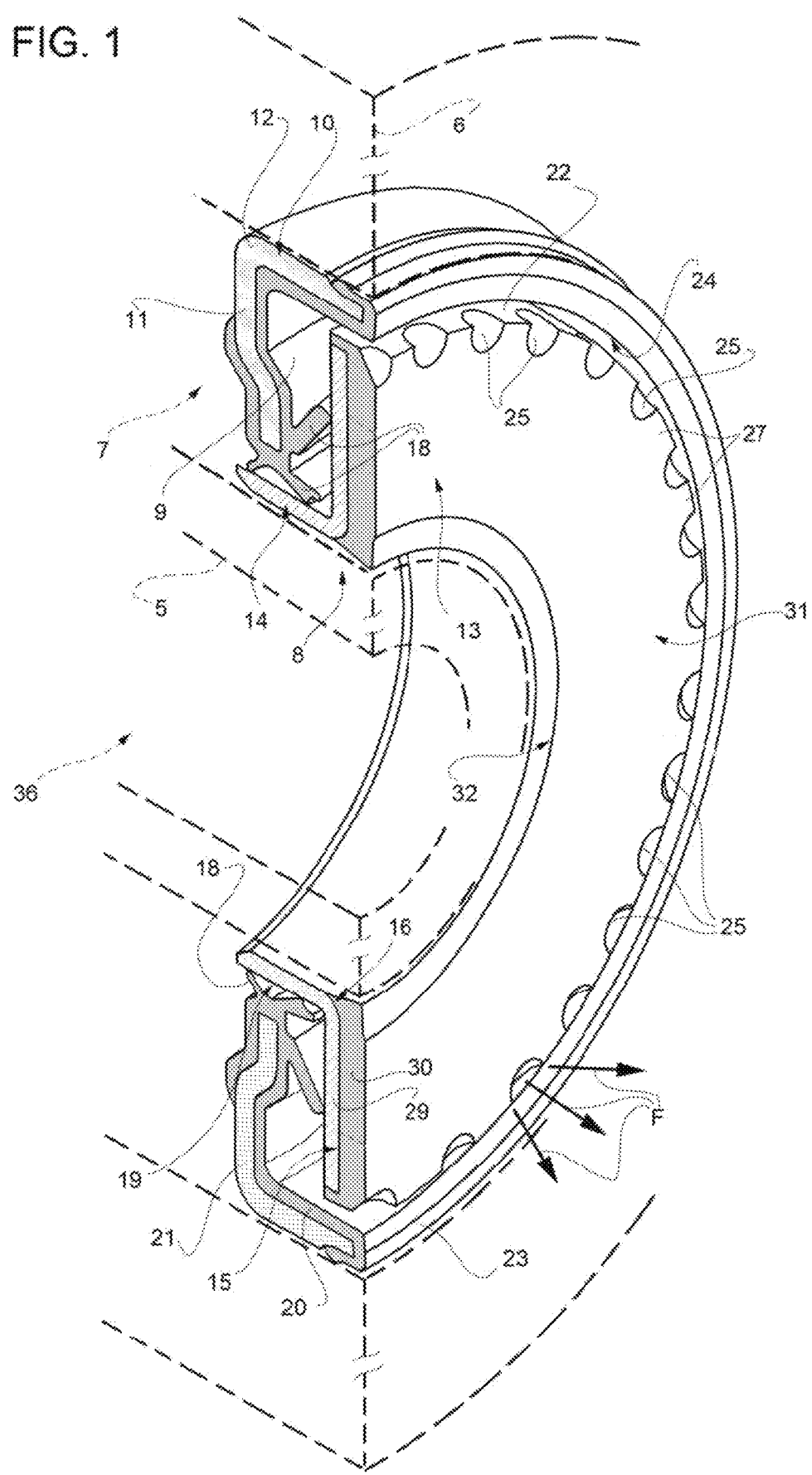
FIG. 1 shows schematically a view in three-quarter front perspective and in radial section of a sealing device according to this disclosure.

With reference to FIG. 1, the number 8 indicates the whole of a sealing device that is generally insertable between a first annular mechanical member 5 and a second annular mechanical member 6, shown purely schematically and only partially in broken lines, these members being fitted, in a known way which for simplicity is not shown, in a relatively rotating way, the member 5 being the member rotating about its own axis of symmetry and the member 6 being the fixed member; for example the members 5 and 6 may be, respectively, the rotating inner ring and the fixed outer ring of a rolling bearing, or may be two machine members made to be relatively rotational by means of a rolling bearing interposed between them.

In order to protect an annular compartment 7, delimited between the relatively rotatable members 5 and 6, from any external contaminants, and/or to retain any lubricating fluid in the annular compartment 7, inside a rolling bearing for example, the sealing device 8 is inserted between the members 5 and 6, coaxially with these members, as illustrated in a non-limiting way.

In fact, the sealing device 8 can be inserted between any two relatively rotatable annular members, and therefore the following description refers to the mechanical members 5 and 6 purely by way of example, without thereby losing its generality.

The sealing device 8 comprises a first annular element 9 having a first sleeve portion 10, which is the radially outer portion in the illustrated example, configured for coupling in an angularly fixed way, in use, to the member 6, which is stationary in use, and a first flange portion 11 which extends in cantilever fashion from a first edge 12 of the sleeve portion 10 in a first radial direction, which in the illustrated example runs radially inside the sleeve portion 10.

The sealing device 8 also comprises a second annular element 13, positioned coaxially with the first annular element 9 and comprising a second sleeve portion 14, which is the radially inner portion in the illustrated example, configured for coupling in an angularly fixed way, in use, to the member 5, which is rotating in use, and a second flange portion 15 which projects from a first edge 16 of the second sleeve portion 14 opposite the edge 12; the flange portion 15 extends in a projecting manner in a radial direction opposite to the radial direction in which the flange portion 11 extends in a projecting manner; in the illustrated example, this second radial direction runs radially outside the sleeve portion 14.

The second flange portion 15 faces the first flange portion 11, and more generally the second annular element 13 is inserted within the first annular element 9, radially inside the latter and coaxially with it.

The first element 9 is provided with at least one elastically deformable annular sealing lip 18, which, in the non-limiting preferred example illustrated, is configured for interacting slidingly with a frontal surface 19 of the second element 13, facing towards the first element 9. Alternatively, the annular sealing lip 18 may be configured to be non-sliding, but for forming a labyrinth seal with the frontal surface 19.

Evidently, as will be seen, it is possible and often preferable for there to be a plurality of annular sealing lips 18, configured for forming radial or axial sliding or labyrinth seals, according to configurations which are known as a whole and are therefore not illustrated for the sake of simplicity.

In the illustrated non-limiting example, the annular element 9 is formed by an annular sealing element 20 and an annular reinforcing element or support, 21, preferably made of metal, which has been fixed to the annular sealing element 20, preferably by bonding in the course of vulcanization.

In the illustrated example, the element 9 is provided with a plurality of annular sealing lips, consisting of three annular sealing lips 18 in the illustrated example, of a known type and configuration, which extend radially and/or axially in cantilever fashion from the flange portion 11.

The lips 18 form an integral part of the annular sealing element 20 and are preferably configured for interacting slidingly and with slight interference on annular elements or shields 9 and 13, which are coupled to the flange portion 14 by means of the two radially inner lips 18 and to the sleeve portion 15 by means of the radially outer lip 18, all on the frontal surface 19. Alternatively, one or more of the lips 18 may be configured for interacting with the flange portion 14 and/or with the sleeve portion 15 without sliding, but closely to these portions so as to form a labyrinth seal. In both cases, the annular element 13 therefore serves as an additional component acting as a counter-face for the annular sealing element 20.

According to an arrangement which is known, but which forms an integral part of the present disclosure, in combination with what has been described above, the second annular element 13 is configured to interact with the first annular element 9, the elements 9 and 13 being coupled coaxially (and, in the illustrated non-limiting example, with the second inside the first as described above), so that a radial edge 22 of the second flange portion 15 is positioned at a second edge 23 of the first sleeve portion 10, thus forming with the latter an annular radial gap 24 configured to form a labyrinth seal between the first annular element 9 and the second annular element 13.

According to a first aspect of some embodiments in accordance with this disclosure, the radial edge 22 of the flange portion 15 carries a plurality of depressions 25 arranged in a crown, spaced adjacently to one another in sequence along the whole radial edge 22, and positioned at the radial gap 24, immediately facing and adjacent to the edge 23 of the sleeve portion 10 of the element 9. Additionally, the depressions 25 face in the opposite direction from the flange portion 11 of the element 9, and, especially, are formed on a frontal face 26 of the element 13 opposite the frontal surface 19 and belonging to the flange portion 15.

The depressions 25 are configured to generate, as a result of a rotation of the second annular element or shield 13 relative to the first annular element or shield 9 and in interaction with the second edge 23 of the sleeve portion 10, because of the presence of the radial gap 24, a dynamic centrifuging effect F, which for example is directed not only tangentially but also axially and/or radially, and which is capable of repelling any contaminants impelled towards said radial gap 24, so that they are unable to reach it, thereby eliminating the risk that any contaminant may penetrate the labyrinth seal formed by the gap 24 and enter the annular space between the shields 9 and 13, thus reaching the sealing lip 18 nearest to the flange portion 10, which in the illustrated example is the radially outer lip.

This dynamic centrifuging effect F is greatly improved in terms of force, direction and path by the presence of the depressions 25, by comparison with, for example, conventional centrifuging elements, since it can throw any solid contaminants far from the gap 24, the contaminants being intercepted by the depressions 25, and when liquid or similar contaminants (such as water, mud, etc.) are present this flow is diverted by the depressions 25, which act as the blades of a turbine.

According to a further aspect of some embodiments in accordance with this disclosure, the depressions 25 alternate with solid circumferential portions 27 with no discontinuities of the radial edge 22, these portions 27 being spaced apart from the edge 23 of the sleeve portion 10 by a quantity equal to the gap 24.

According to one aspect of some embodiments in accordance with this disclosure, the depressions 25 are also formed across the radial edge 22 of the flange portion 15, on the side opposite the frontal surface 19, so as to extend partially on the face 26, which in turn faces in the opposite direction from the first element 9.

Figure 3:
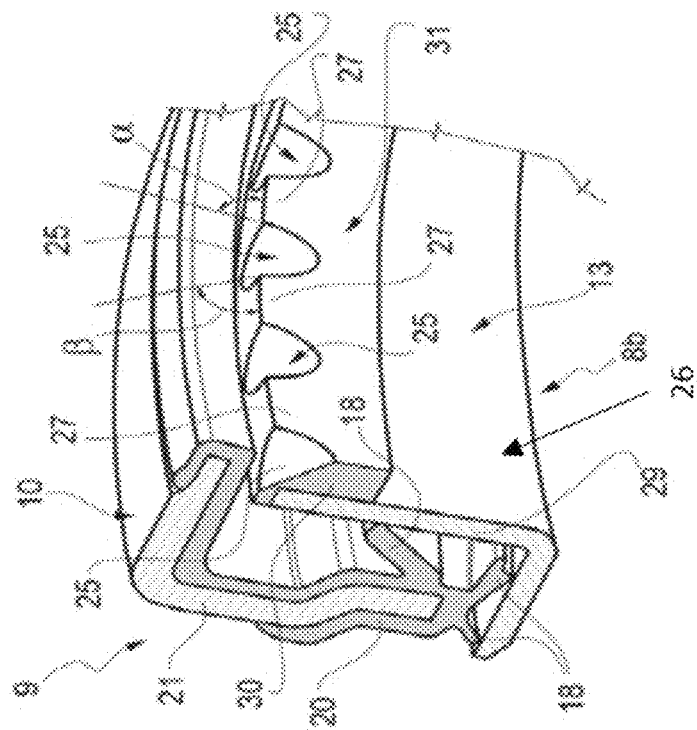
FIGS. 2-7 show schematically the same three-quarter front perspective view, in radial section and truncated for simplicity, of various embodiments of the sealing device in accordance with this disclosure.

According to another aspect of some embodiments in accordance with this disclosure, the depressions 25 have a profile such that respective opposite lead angles α and β are formed with the radial edge 22 of the flange portion 15 on the face 26 (FIG. 3).

These angles α and β may preferably be symmetrical with one another, so that the dynamic effect F generated by the depressions 25 is identical, independently of the direction of relative rotation between the first and second element 9 and 13; alternatively, the opposed lead angles α and β are asymmetrical with one another, so that the intensity of the dynamic effect F generated by the depressions 25 varies with the direction of relative rotation between the first and second element 9, 13. The latter characteristic may be useful when the rotating member 5 has a preferred direction of rotation.

With reference to FIGS. 2 to 7, these illustrate schematically various embodiments described up to this point, indicated by the reference numerals 8a to 8f For the sake of simplicity, details similar or identical to those described previously are indicated with the same numbers.

Figure 5:
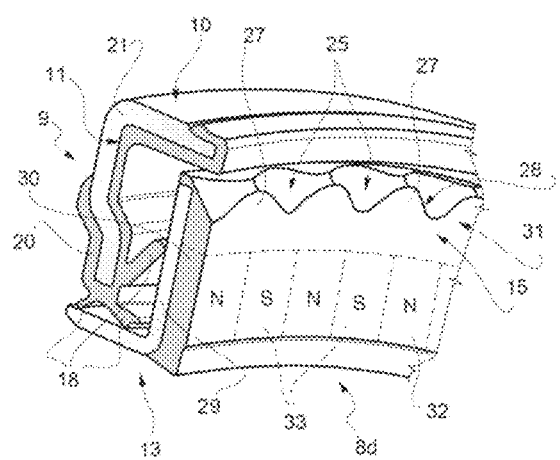
Figure 6:
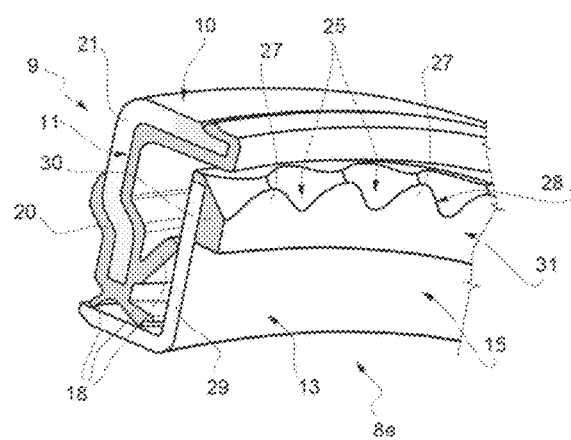
Figure 7:
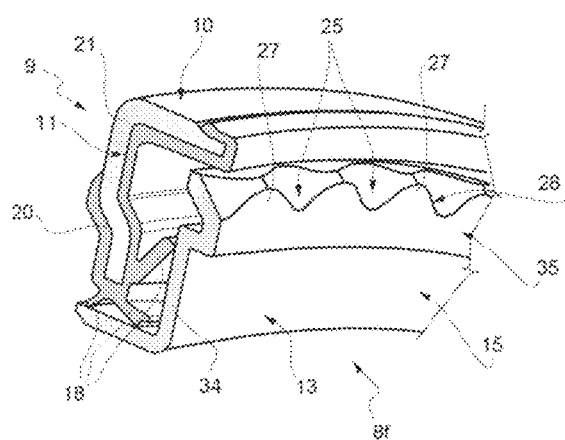

As shown in FIGS. 5, 6 and 7, the depressions 25 and the solid portions 27 are defined by a wavy profile 28 carried by the radial edge 22 of the flange portion 15 on the side opposite to the flange portion 11 of the first element 9.

Figure 2:
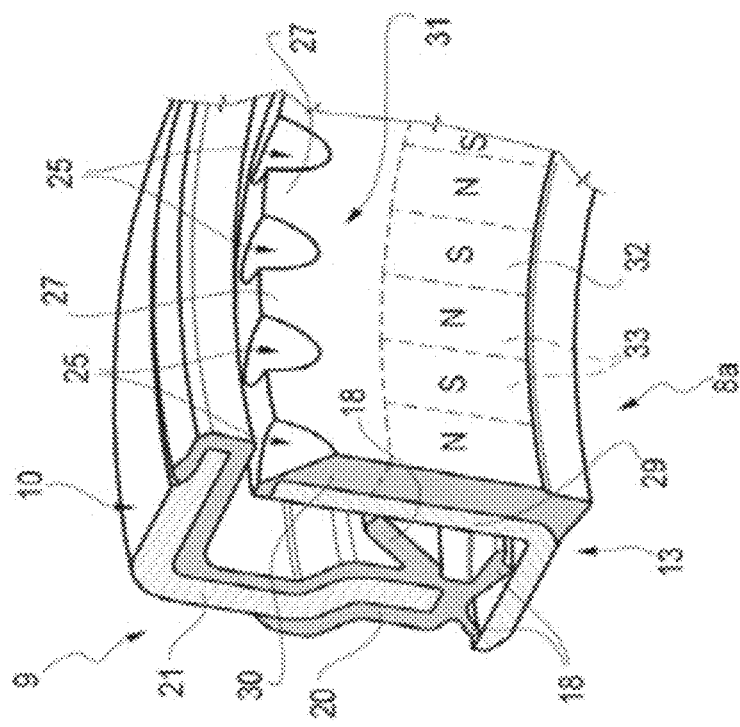
Figure 4:
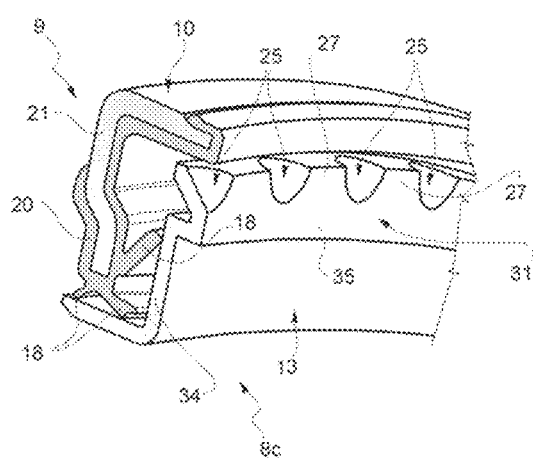

According to the variants shown in FIGS. 2, 3 and 4, however, the depressions 25 are formed on or in the edge 22 and are spaced apart by a constant interval, so as to leave between them the solid portions 27, consisting of intact portions 27 of edge 22.

According to preferred embodiments, indicated by 8 (FIG. 1), 8a, 8b, 8d, 8e, the second element 13 (FIGS. 1, 2, 3, 5 and 6) comprises a substantially rigid annular reinforcing element 29, preferably made of metal, delimiting both the flange portion 15 and the sleeve portion 14, and an annular insert 30 made of a synthetic or elastomeric plastic material, preferably co-moulded in one piece or bonded during vulcanization on the annular reinforcing element 29 on the side opposite to the first element 9. Alternatively, the annular insert 30 may also be simply bonded to the annular reinforcing element 29, or may be fixed to it by snap-fitting.

The insert 30 forms, with the annular reinforcing element 29, the radial edge 22 of the second flange portion 15 of the second annular element 13.

According to these embodiments, the depressions 25 are formed solely on a first radial edge portion 31, which in the illustrated example is the radially outer portion, of the insert 30, facing towards the sleeve portion 10 of the first element 9.

According to the embodiments indicated by 8, 8a and 8d (FIGS. 1, 2 and 5), the annular insert 30 extends, according to the illustrated examples, over the whole frontal face 26 of the flange portion 15 of the element 13, which is opposite the element 9. It is also possible for the insert 30 to extend over only an annular portion, which is the radially outer portion in this case, of the frontal face 26.

In the non-limiting embodiments indicated above, the insert 30 not only comprises the radial edge portion 31 but also comprises a second radial edge portion 32 facing in the opposite direction from the sleeve portion 10 of the first element 9, which in the illustrated example is the radially inner portion, formed in one piece with the first radial edge portion 31.

The radial edge portion 32, according to the preferred but non-limiting embodiments illustrated, is configured to form an encoder element, of a known type, having a circumferential sequence of radial portions 33 having physical or magnetic discontinuities, these portions, in the illustrated examples, being magnetized with opposite polarities, N (north) and S (south). If the insert 30 is not required to act additionally as an encoder, then clearly these physical or magnetic discontinuities are not present, even when the annular insert 30 extends, according to the illustrated examples, over the whole frontal face 26.

Finally, in the embodiments 8c and 8f (FIGS. 4 and 7), the second element 13 is formed solely by a substantially rigid annular element 34, preferably made of metal, delimiting both the flange portion 15 and the sleeve portion 14.

In this case, the flange portion 15 comprise a protruding annular radial portion 35, projecting in cantilever fashion in an axial direction on the opposite side from the first element 9 and delimiting/defining the radial edge 22 of the flange portion 15.

According to these embodiments 8c, 8f, the depressions 25 are formed on the protruding annular radial portion 35 on the opposite side from the first flange portion 11.

In the embodiment 8c of FIG. 4, the depressions 25 are formed from hollows or indentations produced by plastic deformation of circumferential portions of the annular radial portion 35, alternating with non-deformed portions which therefore form the solid portions 27.

In the embodiment 8f of FIG. 7, the depressions 25 are formed by the wave troughs of the wavy profile 28, while the wave crests form the solid portions 27 that are free of discontinuities. The wavy profile 28 is formed by plastic deformation of the whole edge 22, by moulding/embossing for example.

Similarly, in the embodiment 8d of FIG. 5, in this case also the depressions 25 are formed by the wave troughs of the wavy profile 28, while the wave crests form the solid portions 27 that are free of discontinuities, and the wavy profile 28 is formed by injection moulding or compression directly on the insert 30, during the step of moulding the insert.

Finally, it is evident from the above description that various embodiments described herein also relates to a sealing system 36 (FIG. 1) comprising a sealing device 8 according to any of the embodiments described above, and a first and a second annular mechanical member, such as the members 5, 6, coupled together so as to be relatively rotatable, in which:
    the first element 9 is attached in an angularly fixed way to the annular member 6 that is stationary in use,
    the second element 13 is attached in an angularly fixed way to the annular member 5 that is rotating in use,
    the first element 9 is housed within the annular compartment 7 delimited between the first and second annular members numbered 5 and 6 in the non-limiting illustrated example,
    the second element 13 is positioned radially inside the first element 9 and towards the outside of the annular compartment 7, on the opposite side from the first element 9, so that its flange portion 15 substantially closes off the compartment 7 (except for the gap 24) from the external environment.

The object of the present invention is to provide a sealing device that is free of the drawbacks of the prior art, while being reliable and economical, and particularly one that permits a reduction of the friction created in use by the sealing device, and therefore the friction torque, with its consequent energy consumption, by reducing the number of sealing lips configured to be slidingly coupled, in use, to one of two members in relative motion, but without losing sealing capacity, or, conversely, one that permits an increase in the sealing capacity without increasing the friction torque, or in the presence of lips configured for labyrinth seals only.

According to the invention, therefore, a sealing device insertable between a first and a second mechanical member in relative rotation, between the rings of a rolling bearing for example, is provided, together with an associated sealing system, with the characteristics disclosed in the attached claims.

Because of the favourable phenomenon consisting in the generation of the dynamic effect F, and according to other possible embodiments, the outer lip 18 may even be eliminated in order to reduce the friction (if sliding lips are present), or alternatively the interference found at the design stage between the lips 18 and their sliding surface 19 may be reduced even without varying the number of lips 18, again with the aim of reducing friction.

All the objects of the invention are therefore achieved.

The invention claimed is:

1. A sealing device insertable between two relatively rotatable mechanical parts, comprising:
    a first annular element having a first sleeve portion angularly fixed to a first of the two relatively rotatable mechanical parts when in an inserted condition;
    a first flange portion that extends in a cantilever fashion from a first end of the first sleeve portion in a first radial direction;
    a second annular element, arranged coaxial to the first annular element and comprising a second sleeve portion angularly fixed to and rotating with a second of the two relatively rotatable mechanical parts when in an inserted condition; and
    a second flange portion that extends in a cantilever fashion from a first end of the second sleeve portion and in a second radial direction opposite to the first radial direction, the second flange portion facing the first flange portion,
    wherein the first annular element is provided with at least one annular seal lip that is elastically deformable and cooperates in a sliding manner with a frontal surface of the second annular element which faces the first annular element;
    wherein a radial annular gap is formed by a radial edge of the second flange portion and a second end of the first sleeve portion that provides a labyrinth seal between the first annular element and the second annular element,
    wherein the radial edge of the second flange portion comprises a plurality of depressions arranged in a crown adjacently spaced from one another in sequence along the radial edge of the second flange portion,
    wherein at the radial gap, the plurality of depressions face and are adjacent to the second end of the first sleeve portion of the first element and face away from the first flange portion of the first element,
    wherein said depressions each have a profile such as to form with the radial edge of the second flange portion respective opposite lead angles ($\alpha$, $\beta$) asymmetrical with one another.

2. The sealing device of claim 1, wherein each of the plurality of depressions alternate circumferentially with a plurality of solid circumferential portions, the solid circumferential portions being a radial distance from the second end of the first sleeve portion equal to a radial distance defining the radial gap.

3. The sealing device of claim 1, wherein the depressions are formed astride with the radial edge of the second flange portion and extend over a side axially opposite the frontal surface.

4. The sealing device of claim 1, wherein the second annular element further comprises:
   a substantially rigid annular reinforcing element delimiting the second flange and the second sleeve portion, and
   an annular insert fastened integrally to the annular reinforcing element on a side axially opposite the frontal surface,
   wherein the annular insert and the annular reinforcing element define the radial edge of the second flange portion of the second annular element, and wherein the depressions are formed on a first radial end portion of the annular insert facing the first sleeve portion of the first annular element.

5. The sealing device of claim 4, wherein the annular insert further comprises a second radial end spaced from the first radial end portion and formed integrally with the first radial end portion, wherein the annular insert extends over a whole frontal face of the second flange portion of the second annular element.

6. The sealing device of claim 5, wherein the second radial end portion further comprises an encoder element having a circumferential sequence of radial portions with a plurality of discontinuities.

7. The sealing device of claim 6, wherein the discontinuities are magnetic discontinuities.

8. The sealing device of claim 6, wherein the discontinuities are physical discontinuities.

9. The sealing device of claim 4, wherein the annular reinforcing element is made of metal.

10. The sealing device of claim 9, wherein the annular insert is made of a synthetic plastic material.

11. The sealing device of claim 10, wherein the annular insert is co-moulded on the annular reinforcing element.

12. The sealing device of claim 9, wherein the annular insert is made of an elastomeric plastic material.

13. The sealing device of claim 4, wherein the annular insert is snap-fitted to the annular reinforcing element.

14. The sealing device of claim 1, wherein the second annular element further comprises:
   a substantially rigid annular element, delimiting the second flange and the second sleeve portion; and
   the second flange portion further comprises:
      an annular radial portion, protruding in a cantilever fashion in an axial direction on the side opposite to the first annular element and delimiting the radial edge of the second flange portion,
      wherein the depressions are formed on the annular radial portion facing away from the first flange portion.

15. The sealing device of claim 1, wherein the first annular element is housed inside an annular compartment defined between the first and the second mechanical parts, and wherein the second annular element is arranged radially inside of the first annular element and on a side facing an outside of the annular compartment.

* * * * *